United States Patent [19]
Valimont et al.

[11] Patent Number: 4,704,174
[45] Date of Patent: Nov. 3, 1987

[54] METHOD FOR MANUFACTURING A LAMINATED WINDOW

[75] Inventors: James L. Valimont, Cheswick, Pa.; Alan L. Dumbris, Newburgh, Ind.

[73] Assignee: PPG Industries, Inc., Pittsburgh, Pa.

[21] Appl. No.: 807,923

[22] Filed: Dec. 12, 1985

[51] Int. Cl.$^4$ .............................................. B32B 17/00
[52] U.S. Cl. .................................... 156/101; 156/252; 156/253; 156/289; 156/309.6; 248/481; 296/84 B; 296/84 K; 428/138
[58] Field of Search ............... 156/101, 253, 252, 289, 156/303.1, 309.6, 513; 428/138; 248/481; 296/84 B, 84 K; 234/1

[56] References Cited
U.S. PATENT DOCUMENTS
3,725,172  4/1973  Fekete et al. ...................... 156/252

Primary Examiner—John J. Gallagher
Attorney, Agent, or Firm—Donald Carl Lepiane; Robert A. Westerlund, Jr.

[57] ABSTRACT

A method for manufacturing a bilayer or antilacerative windshield comprised of a rigid substrate and an innerliner, including the steps of producing a hole in the innerliner, assembling the rigid substrate and the innerliner together in interfacial relation to each other, and then placing an insert into the hole. Thereafter, the rigid substrate and the innerliner are laminated together to thereby provide the antilacerative windshield, the insert serving to prevent flow of the innerliner into the hole during the laminating step. After the laminating step is completed, the insert is removed from the hole, to thereby open the hole to expose the adjacent surface of the rigid substrate. The mounting pad or "button" of a rear view mirror is then affixed to the exposed surface of the rigid substrate.

20 Claims, 5 Drawing Figures

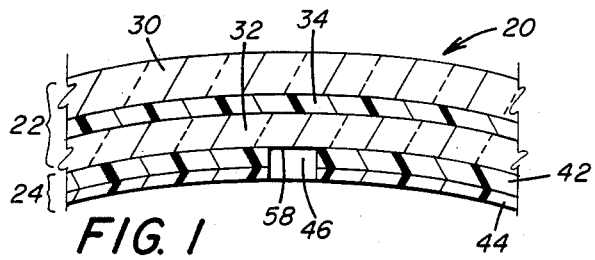
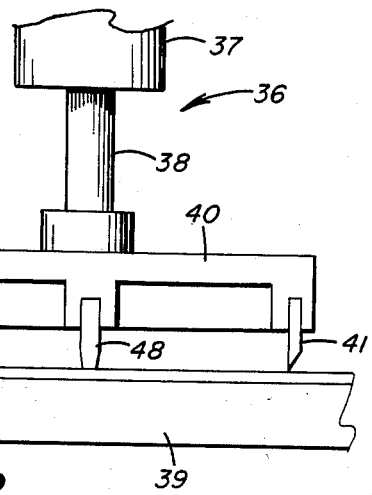
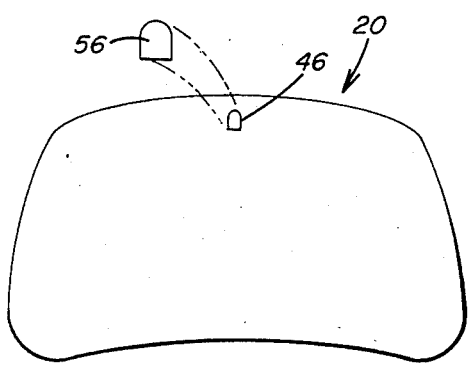
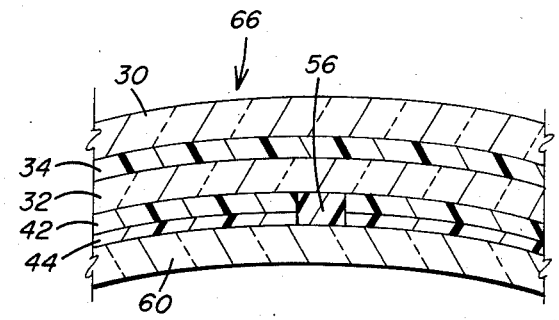
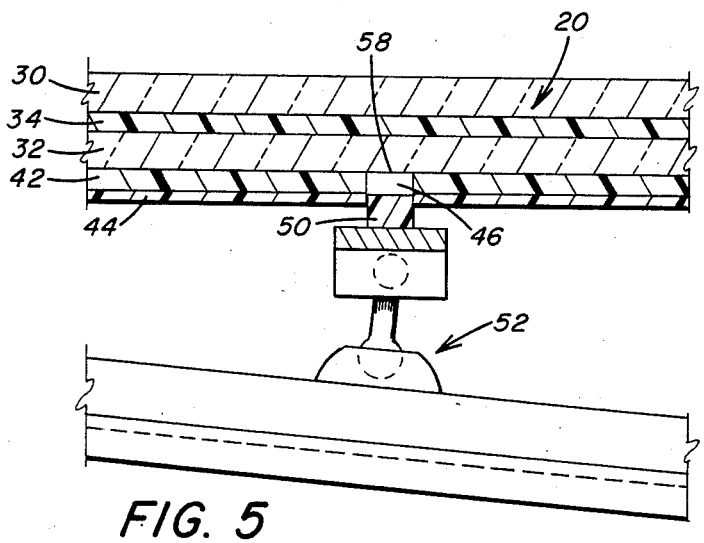

METHOD FOR MANUFACTURING A LAMINATED WINDOW

FIELD OF THE INVENTION

The present invention relates generally to a process or method for fabricating laminated windows and more particularly, to a method for preparing an antilacerative windshield assembly for application of a rear view mirror thereto.

BACKGROUND OF THE INVENTION

There are presently available many types of safety glass structures which may be employed as vehicular lights (e.g. automotive windshields), architectural windows (e.g. skylights), or in various other commercial and industrial contexts. Safety glass structures can be classified into two basic categories, namely, laminated safety glass windows and bilayer windows.

Laminated safety glass windows generally include two plies of glass or other rigid transparent or translucent substrate laminated to an interlayer of polyvinyl butyral, polyurethane, or other suitable transparent or translucent plastic film. To be useful as a laminated safety glass window, a laminate must possess the following properties over a wide range of temperature and moisture conditions: (1) high energy absorption to minimize concussive injuries on impact, (2) prevention of rupture of the film by glass fragments, (3) sufficient adhesion between the layers to minimize dispersion of glass fragments, thereby reducing the potential for lacerative injury, and (4) good optical quality. Representative examples of laminated safety glass windows and methods of producing/manufacturing the same are taught in U.S. Pat. Nos. 2,725,320; 3,027,288; 3,074,466; 3,700,542; 3,769,288; 3,881,043; 3,852,136; 4,062,887; and, 4,180,426.

Bilayer windows generally include a rigid transparent or translucent substrate laminated to a layer of protective transparent or translucent plastic material. The protective layer is usually provided on the surface of the substrate facing the interior of the window-protected environment, and is therefore often referred to as the innerlayer or innerliner, as opposed to an interlayer. The rigid substrate may comprise a single transparent or translucent glass (or other rigid material) substrate, or a laminated safety window. Bilayer windows are designed to minimize facial lacerations attributable to sharp edges of broken glass of the inner glass ply and to absorb concussive forces occurring under impact conditions, more so than conventional laminated safety glass windows which are not provided with a protective plastic layer in covering relation to the inner glass ply. The protective plastic coating or innerliner prevents a person disposed interiorly thereof from coming into contact with the glass. Bilayer windows, especially those wherein the rigid substrate comprises a laminated safety window, when employed as an automotive windshield, are sometimes referred to as antilacerative windshields. The terms "bilayer window" and "antilacerative window" as used herein throughout are interchangeable, and both are intended to convey the meaning of a window comprised of a rigid transparent or translucent substrate laminated to a transparent or translucent protective layer constructed of a material, usually a plastic material, possessing antilacerative properties. Representative examples of bilayer or antilacerative windows and methods for manufacturing the same are taught in U.S. Pat. Nos. 3,781,184; 3,808,077; 4,107,366; 4,109,055; 4,153,526; 4,232,080; and 4,362,587, all teachings of which are herein incorporated by reference.

Although there are presently available many different methods for assembling and laminating the various components of a bilayer or antilacerative window, such as those taught in the above-delineated patents, all of these methods can be said to be comprised of the following basic steps: (1) assembling the rigid substrate and the innerliner in conforming, juxtaposed relation to each other, to provide a bilayer assembly; (2) removing any trapped gases or air from the interfacial spaces between the various plies or layers of the bilayer assembly, usually by means of pulling a vacuum around the peripheral edges of the assembly; and, (3) subjecting the assembly to heat and pressure conditions sufficient to firmly bond or laminate the various plies or layers together, usually within an air and/or oil autoclave. A molding or pressing plate, sometimes referred to as a laminating mold or pressing ply, having a surface contour matching or closely conforming to the surface contour of the rigid substrate, is placed against the exposed face of the innerliner during the degassing and laminating steps, to ensure application of uniform pressure against the innerliner, thereby minimizing the occurrence of optical defects.

A problem which has apparently not yet been addressed heretofore is the problem of removing selected portions of the innerliner to accommodate or facilitate the mounting or attachment of appurtenances, accessories, or other objects or structures to the inner surface of the rigid substrate. Prior to the advent of the present invention, applicant knew of only one feasible technique for cutting out a selected portion of the innerliner to expose a selected portion of the adjacent or inner surface of the rigid substrate. An exemplary situation is the problem of affixing a rear view mirror to a bilayer or antilacerative windshield. The presently known technique is to manually cut a patterned hole into the innerliner at the location whereat the rear view mirror is desired to be mounted. The patterned hole is made to conform to the size and shape of an adhesive pad or "button" which is inserted into the patterned hole to secure the rear view mirror to the inner surface of the rigid substrate. The innerliner is usually cut with a razor blade or other manual cutting tool. The actual hole cutting operation, in accordance with the heretofore known technique, is performed subsequent to the completion of the laminating step. This is necessary, because if the hole were cut out before the laminating step, the innerliner material, or in some cases, the adhesive material employed to adhere the innerliner material to the inner surface of the rigid substrate, would flow into the hole, due to the heat and pressure experienced concomitant with the laminating step, thereby frustrating the objective of exposing the inner glass surface. Additionally, if the innerliner material flows into the hole it may also cause optical defects in the innerliner, and/or cause undesirable binding of the innerliner to the molding or pressing plate.

Several disadvantages are inherent with the above-described heretofore known technique. First of all, the positioning or locationing of the hole is subject to variation and inaccuracy attributable to human error. Secondly, the manual hole cutting step represents an additional step in the overall antilacerative windshield production process. Thirdly, the manual hole cutting step is time consuming and labor intensive, thereby entailing production inefficiencies. Fourthly, manual cutting can cause damage to the underlying rigid substrate. Further, the only technique heretofore known by applicant for cutting the innerliner to the desired size and shape encompasses manually cutting a sheet of innerliner material with a razor blade or other type of manual cutting tool. This manual cutting step is time-consuming, labor intensive, and susceptible to human error, all of which are drawbacks to the overall efficiency of the laminated window production process.

It would therefore be advantageous to have a method for manufacturing a laminated window which overcomes the disadvantages and drawbacks of the heretofore known method.

SUMMARY OF THE INVENTION

The present invention relates to a method for manufacturing a laminated window comprised of a rigid substrate and an innerliner, including the steps of producing a hole in the innerliner, assembling the rigid substrate and the innerliner together in interfacial relation to each other, and then placing an insert into the hole. Thereafter, the rigid substrate and the innerliner are laminated together to thereby provide the laminated window, the insert serving to prevent flow of the innerliner into the hole during the laminating step. After the laminating step is completed, the insert is removed from the hole, to thereby open the hole to expose the adjacent surface of the rigid substrate. In a preferred embodiment of the invention, the laminated window is a bilayer or antilacerative windshield and the mounting pad or "button" of a rear view mirror is adhesively bonded to the exposed adjacent surface of the rigid substrate. Further, the hole is preferably produced with automatic hole producing facilities. In one particular preferred embodiment of the instant invention, the automatic hole producing facilities include a press adapted to move a hole cutter towards and away from the innerliner for producing the hole at a predetermined location in the innerliner. Yet further, the press preferably also includes facilities for automatically pattern cutting the innerliner to a predetermined size and configuration substantially corresponding to the size and configuration of the rigid substrate. It is contemplated that the hole producing and innerliner pattern cutting steps may be performed simultaneously.

BRIEF DESCRIPTION OF THE DRAWINGS

FIG. 1 is a partially broken, cross-sectional view of a bilayer assembly depicting the hole produced in the innerliner by the method of this invention.

FIG. 2 is an elevational, partially diagrammatic view of the press used in a preferred embodiment of the method of the present invention.

FIG. 3 is a plan view of the antilacerative windshield manufactured by the method of a preferred embodiment of this invention, depicting the innerliner hole and the insert employed to fill the hole.

FIG. 4 is a partially broken, cross-sectional view of the bilayer assembly of FIG. 1, but further depicting the innerliner hole filled by the insert of this invention, and a pressing ply employed during degassing and lamination of the bilayer assembly.

FIG. 5 is the same view as FIG. 1, but further depicting a rear view mirror affixed to the assembly.

DESCRIPTION OF THE INVENTION

The present invention can best be understood in light of the ensuing discussion concerning the general process of manufacturing laminated windows, particularly bilayer or antilacerative windows comprised of a rigid transparent or translucent substrate laminated to a transparent or translucent protective layer constructed of a material, usually a plastic material possessing antilacerative properties. The protective layer will be hereinafter throughout referred to as the "innerliner", since it is intended that the protective layer be exposed directly to the environment being protected by the window. By way of contrast, a conventional laminated safety glass window is comprised of two glass plies laminated to an "interlayer" of plastic material interposed therebetween. Bilayer windows can be employed as vehicular lights (e.g. automotive windshields), architectural windows (e.g. skylights), or in various other commercial and industrial contexts. Further, the rigid substrate of the bilayer window may itself include a laminated safety glass window, or a single ply of glass, or any other single or multi-ply assemblage suitable for use in a window. Neither the type of rigid substrate nor the type of innerliner employed is limiting to the instant invention. Representative examples of bilayer or antilacerative windows are taught in U.S. Pat. Nos. 3,522,143; 3,781,184; 3,900,673; 4,059,469; 4,072,779; 4,103,070, 4,109,055; 4,112,171; 4,153,526; 4,232,080; 4,242,403; and 4,469,743, all of which teachings are herein incorporated by reference.

Although there are presently available many different methods for manufacturing a bilayer window, all of these methods include the following basic steps: (1) assembling the rigid substrate and the innerliner in conforming, juxtaposed relation to each other, to provide a bilayer assembly; (2) removing any trapped gases from the interfacial spaces between the various plies or layers of the bilayer assembly; and, (3) subjecting the assembly to heat and pressure conditions sufficient to firmly bond or laminate the various plies or layers together, usually within an air and/or oil autoclave. Representative examples of methods for producing or manufacturing a laminated window are taught in U.S. Pat. Nos. 3,769,133; 3,806,387; 3,808,077; 3,852,136; 3,881,043; 3,960,627; 3,971,668; 4,107,366; 4,152,188; 4,180,426; 4,247,355; 4,327,634; and 4,362,587, all of which teachings are herein incorporated by reference.

Referring now to FIG. 1, there can be seen a bilayer assembly 20 including a rigid substrate 22 interfacially engaged with an innerliner 24. The rigid substrate 22 may include any convenient type of glazing substrate including, but not limited to, plate, sheet or float glass, polycarbonate, or any other convenient rigid transparent or translucent substrate. In a preferred embodiment of the instant invention, the rigid substrate 22 comprises a bent or curved laminated safety glass window assembly comprised of an outer glass substrate 30, an inner glass substrate 32, and an interlayer 34 of flexible transparent or translucent material interposed therebetween. The interlayer 34 may be constructed of, for example, polyurethane, polyvinyl butyral, or any other convenient interlayer material, such as is taught in U.S. Pat. Nos. 3,700,542; 3,509,015; 4,241,140; 3,522,143; or 4,062,887. The bent safety glass window assembly or rigid substrate 22 is conveniently suitable for use in an automotive windshield. However, the type of rigid substrate 22 employed is not limiting to the present invention. For example, the substrate 22 may be thermally or chemically tempered or otherwise strengthened, or may be tinted, coated, or colored, or may possess any other convenient optical, strength, solar energy control, or aesthetic properties/characteristics. The innerliner 24 may be made of any convenient transparent or translucent material which is characterized by a degree of flexibility, tensile strength, and tight adherence to the inner glass substrate 32, such that when laminated thereto to provide a windshield, the innerliner 24 should serve to minimize concussive and lacerative injuries. Suitable innerliner materials include polyester, polyvinyl chloride, polyvinyl butyral, polyurethane, polyvinyl acetal, cellulose acetate, and polyamide or polymethyl methacrylate, or combinations thereof, such as is taught in U.S. Pat. Nos. 2,047,253; 2,184,876; 3,806,387; 4,103,070; 3,781,184; 3,900,673; 4,107,366; 4,072,779; 4,109,055; 4,112,171; 4,362,587; 4,153,526; 4,232,080; and 4,469,743. The innerliner material may be coated with an adhesion-promoting or coupling agent to improve its adherence to the exposed surface of the inner glass substrate 32. Alternatively, the exposed surface of the inner glass substrate 32 may be coated with a coupling agent to effect the same purpose. Generally, a suitable material for an adhesion-promoting composition or coupling agent is an alkoxy silane used for enhancing the adherence of a polyurethane innerliner to a glass substrate, such as is taught in U.S. Pat. No. 3,881,043, which teachings are herein incorporated by reference. U.S. Pat. Nos. 4,059,469; 4,072,779; and 4,112,171, which are herein incorporated by reference, teach the employment of a soft, flexible transparent or translucent layer, such as polyvinyl butyral, to bond a harder layer comprised of a more durable plastic material, such as a polyethylene terephthalate, e.g., the type sold by DuPont Corp. under their trademark "Mylar", to a glass substrate. The type of adhesion-promoting or coupling agent employed, if any, is not limiting to the invention, nor is the manner of its employment. Further, the innerliner 24 may also include a weather and wear/abrasion-resistant coating or layer disposed in covering relation to the primary protective, antilacerative plastic layer, to face the interior of the window-protected environment. The primary requisites of these so-called anti-abrasive films or coatings are low permeability to gases and moisture, chemical stability, good resistance to ultraviolet radiation, and sufficient flexibility to provide the necessary scratch and abrasion resistance. Suitable anti-abrasive film or coating materials are taught in U.S. Pat. Nos. 2,047,253; 2,184,876; 3,781,184; 3,958,245; 3,806,387; 4,107,366; 4,177,315; 4,164,602; 4,242,403; 3,900,673; and 4,469,743, all of which teachings are herein incorporated by reference. The anti-abrasive film materials taught in the above-referenced patents include polyvinyl chloride, polyvinylidene fluoride, polyisobutylene, copolymers of vinylidene chloride and vinyl chloride, polyamides, polyesters, blocked copolymers of ethylene and propylene, ethylenic ionomer, polyvinyl fluoride (e.g., of the type sold by DuPont Corp. under their trademark TEDLAR), polyester (e.g., of the type sold by DuPont Corp. under their trademark MYLAR), phenoxy polymers, an ionized olefin copolymer sold by DuPont Corp. under their trademark SURLYN, and cellulose acetate. However, the type of anti-abrasive film or coating employed, if any, is not limiting to the invention.

In accordance with the present invention, the innerliner 24 is preferably cut or otherwise formed to a predetermined size and configuration prior to assembly with the rigid substrate 22. Further, the cutting step is preferably performed with automatic plastic sheet cutting facilities such as numerically controlled cutting assemblies, or a die press. Representative examples of automatic pattern cutting facilities are taught in U.S. Pat. Nos. 3,477,322; 3,991,636; and 4,171,657. Referring back to FIG. 1, in a preferred embodiment of the present invention, the innerliner 24 is cut by a die press 36, shown in FIG. 2, to an outline or configuration corresponding to that of the rigid substrate 22, which as previously described, includes a bent laminated safety glass window assembly intended for use in an automotive windshield. However, the exact size or dimensions of the innerliner 24 selected may be purposefully smaller or larger than the dimensions of the bent safety glass window assembly 22. The die press 36 includes a superstructure (not shown) carrying a ram 38 adapted for vertically reciprocating movement towards and away from a support surface 39 which supports the innerliner 24 to be cut. The ram 38 is reciprocated by electromechanical, pneumatic, or hydraulic driving facilities 37 attached to the superstructure. The ram 38 carries a rigid platen 40 made of steel or any other convenient rigid material. The platen 40 carries a die cutter 41 corresponding to the predetermined size and configuration desired to be imparted to the innerliner 24. Any convenient manual trimming or cutting means may alternatively be used to pattern cut the innerliner 24. Representative examples of such manual cutting means include pizza cutters, razor blades, or the like. In general, the means employed to pattern cut the innerliner 24 is not limiting to this invention. For example, laser and water jet cutting techniques are also encompassed within the scope of the present invention. Further, the innerliner pattern cutting step may be practiced subsequent to, rather than prior to the assembling step.

The innerliner 24 in said preferred embodiment includes a primary layer 42 constructed of polyvinyl butyral, hereinafter referred to as PVB, and an anti-abrasive layer 44 constructed of a polyester material (e.g., a layer of the type sold by DuPont Corp. under their trademark MYLAR) coated with a silicone-based material. The innerliner 24 material may be bought (e.g. from DuPont Corp.) or otherwise provided in composite sheet form with the primary layer 42 and the anti-abrasive layer 44 already bonded together.

Referring now to FIG. 3, after the innerliner 24 has been pattern cut to a predetermined size and configuration preferably corresponding to the outline of the bent safety glass window assembly 22, as previously discussed, a hole 46 is produced thereinto, in accordance with the present invention. However, it should be clearly understood that the hole 46 may alternatively be produced either before or coincident with the innerliner pattern cutting operation. The only requisite of the instant invention is that the hole 46 be produced prior to the laminating operation, which will be hereinafter discussed. Any convenient hole producing apparatus is contemplated within the spirit and scope of this invention. Manual cutting tools such as pizza cutters, razor blades, or any other cutting tool suitable for cutting through the innerliner material, are appropriate for the task. However, in a preferred embodiment of the instant invention, the hole producing apparatus employed is adapted to automatically produce a hole of a predetermined size and configuration at a predetermined location through the innerliner 24. More particularly, the press 36 preferably incorporates a hole cutter for automatically producing the hole 46 simultaneously with the pattern cutting of the innerliner 24. Referring to FIG. 2, the platen 40 of the press 36 preferably carries a hole cutter 48 having an outline corresponding to the configuration of the hole 46 desired to be produced in the innerliner 24. The hole cutter 48 is attached to the platen 40 at a predetermined location relative to the die cutter 41, such that the hole cutter 48 will produce the hole 46 at a predetermined location relative to the perimetrical dimension of the cut innerliner 24. Both the die cutter 41 and the hole cutter 48 are shown to be comprised of a downwardly tapered blade. However, thermocutters, punchers, stampers, or any other convenient cutting or forming facilities may be used in lieu of the tapered blades. Further, neither the type of hole producing means employed nor the sequence of performing the innerliner pattern cutting and hole producing steps is limiting to this invention. For example, a drilling apparatus or any other convenient automatic or manual hole producing means may alternatively be employed.

Referring back to FIG. 1 and additionally to FIGS. 3 and 4, in accordance with this invention, an insert 56 is positioned within the hole 46 in covering relationship to the surface portion 58 of the inner glass substrate 32 exposed by the hole 46. The size and configuration of the insert 56 is preferably closely matched to that of the hole 46, to thereby at least substantially fill or close the hole 46. The insert 56 is preferably constructed of a material which is at least substantially nonadherent to the innerliner 24, the glass surface of the inner glass substrate 32, and to the surface of a laminating mold or pressing ply 60 which is preferably assembled in superposed relation to the innerliner 24 prior to subsequent manufacturing steps. A preferred insert 56 material is polypropylene. Other suitable insert 56 materials include plasticized polyvinyl chloride, nylons, polyalkylene polymers, and fluorinated polymers. In general, the type of material used for the insert 56 is not limiting to the invention. The pressing ply 60 preferably has certain physical properties the same as the rigid substrate 22 to be laminated so as to minimize optical distortion of the innerliner 24 during lamination. More particularly, the pressing ply 60 has a curvature or surface contour preferably identical to that of the inner glass substrate 32. Further, the pressing ply 60 preferably has the same physical properties such as Young's modulus, hardness, and thermal expansion coefficient as that of the inner glass substrate 32 to avoid localized distortion of the innerliner 24 during the heating and pressure steps associated with lamination. To ensure the application of uniform pressure to the innerliner 24 by the pressing ply 60 during the laminating operation, the pressing ply 60 is preferably a bent rigid sheet at least substantially conforming to the shape, curvature, and thickness of the inner glass substrate 32. However, the type of pressing ply 60 employed is not limiting to the invention. For example, U.S. Pat. Nos. 4,152,188 and 4,247,355 teach the use of an elastic membrane as a pressing ply during lamination. Further, to facilitate easy release of the pressing ply 60 from the bilayer assembly 20 after lamination is completed, a mold release or parting agent may be employed at the interface between the innerliner 24 and the pressing ply 60. The main criterion for suitability of a parting material is that it be completely nonadherent to at least one of the interfacial surfaces. Suitable parting agent materials include those taught in U.S. Pat. Nos. 4,263,350; 3,808,077; 4,107,366; 4,103,070; 4,110,119; and 2,725,320, all of which teachings are herein incorporated by reference. However, it should be clearly understood that the type of release or parting agent employed, if any, is not limiting to the invention. In said preferred embodiment of the present invention, the anti-abrasive layer 44 of MYLAR material coated with the silicone-based material also serves or functions as a release or parting agent to facilitate easy release of the pressing ply 60 after the laminating cycle is completed, thereby precluding the necessity of the provision of a separate parting material. However, to further enhance the releasability of the pressing ply 60, a film of polytetrafluoroethylene or a sheet of TEFLON, or any other convenient release agent, may be employed between the interfacial surfaces of the innerliner 24 and the pressing ply 60. Further, the primary layer 42 of PVB is self-adhesive to the surface of the inner glass substrate 32, thereby precluding the necessity of using an adhesion-promoting or coupling agent at the glass - PVB interface. In an actual embodiment of the present invention, the primary layer 42 of PVB is 15 mils thick and the anti-abrasive layer 44 of silicone-coated MYLAR material is 4 mils thick. The primary layer 42 of PVB materials serves as both an adhesive and as an energy-absorbing medium. The anti-abrasive layer 44 of MYLAR material possesses both energy absorbing and anti-abrasion properties. The silicone-based coating on the MYLAR material functions as both an anti-abrasive layer and as a release or parting agent.

After the bilayer assembly 20 and the pressing ply 60 have been assembled together in superposed, interfacial relation to each other, the resultant multi-ply laminar assembly 66 is ready for the subsequent manufacturing steps of prepressing or degassing and lamination.

In general, the laminar assembly 66 is readied or prepared for the laminating operation by pulling, drawing, suctioning, evacuating, aspirating, pressing out, or otherwise removing air, gas, or any other fluid substances from the interfacial spaces between the various plies making up the laminar assembly 66, thus permitting subsequent lamination to take place without the development of folds, creases, or bubbles at the interply interfaces. There are presently available at least two principal types of methods for removing the fluids from the interply spaces. The first methodological approach is the so-called prepressing or pressing technique, wherein the laminar assembly 66 is pressed by pressure rollers or pinching rollers, thereby calendering the various plies of the laminar assembly 66 to force or press out most of the air, gas, etc. present within the interply spaces. Representative examples of the prepressing type of interply fluid removal method are taught in U.S. Pat. Nos. 2,983,635; 3,351,001; and, 4,327,634, all teachings of which are herein incorporated by reference. The second prelaminating methodological approach is the so-called evacuation technique, wherein a negative pressure or vacuum is applied to the interply edge periphery of the laminar assembly 66 to effect removal of any trapped air, gas, or other fluid matter or the like. There are at least two different approaches to effectuation of the evacuation technique. One general technique is to fit an endless rubber tube or channel ring around the marginal periphery of the laminar assembly 66, with a space being provided between the outer wall of the channel ring and the interply peripheral edge of the laminar assembly 66. The channel ring is then connected to a vacuum source which evacuates the ring and the interply spaces of any trapped air, gas, or the like. Representative examples of the evacuation ring technique are taught in U.S. Pat. Nos. 2,948,645; 3,971,668; 3,074,466; and 4,362,587. The second basic approach to the evacuation technique is to place the laminar assembly 66 within a flexible sack, bag, envelope, or other type of container or enclosure, having at least one side which is movable between open and closed, airtight positions. After the laminar assembly 66 is inserted within the flexible enclosure, a vacuum is pulled through the open side(s) to remove the trapped air, gas, or the like from the interply spaces of the laminar assembly 66. Representative examples of the latter or so-called "vacuum bag technique" are taught in U.S. Pat. Nos. 3,311,517; 3,769,133; 3,960,627; 4,180,426; 3,852,136; 4,152,188; and 4,247,355, all teachings of which are herein incorporated by reference.

In general, after the prepressing or degassing prelaminating step is concluded, or simultaneously therewith, the laminating operation begins. The laminating operation consists of applying sufficient heat and pressure to the laminar assembly to effect a uniform, strong, adhesive bond between the innerliner 24 and the rigid substrate 22, and more particularly, within the context of the aforesaid preferred embodiment of this invention, to effect a firm, adhesive unification of the interlayer 34 to the opposed faces of the outer and inner glass substrates 30, 32, respectively, and a firm adhesive bond between the interfacial surfaces of the inner glass substrate 30 and the primary layer 42 of the innerliner 24. It is, of course, possible that the bent laminated safety glass window 22 be prelaminated beforehand or obtained beforehand as a finished product, i.e., a conventional safety glass windshield. In any event, the laminating step is generally carried out in the following described fashion. The laminar assembly 66 with the evacuation ring or the vacuum bag secured thereto, depending upon which prelaminating technique is employed, is placed within an air and/or oil autoclave, where it is subjected to laminating heat and pressure conditions. The laminar assembly 66 may actually be placed within the autoclave prior to the prepressing or degassing step, and heat and/or pressure may be applied within the autoclave during all or a portion of the degassing step. In this way, the degassing and laminating steps can be made to overlap or be performed substantially simultaneously. The time, temperature, and pressure schedule of the laminating cycle is dependent upon such variables as the types of materials to be laminated, the degree of synchronization, if any, of the degassing and laminating stages of the overall manufacturing process, and other process variables. Representative examples of manufacturing processes which employ the synchronous degassing and laminating stages approach are taught in U.S. Pat. Nos. 4,180,426; 3,852,136; 3,074,466; and 3,971,668. Representative examples of manufacturing processes which employ the independent degassing and laminating steps approach are taught in U.S. Pat. Nos. 3,769,133; 4,152,188; 4,247,355; and 3,960,627. However, it should be clearly understood that neither the type of prelaminating nor the type of laminating procedure employed is limiting to the invention. Further, the cycle time, temperature and pressure schedule and other process parameters are not limiting to the invention.

After the laminating cycle is completed, the laminar assembly 66 is removed from the autoclave and the vacuum bag (not shown) or the evacuation ring (not shown) is then removed from the laminar assembly 66. Next, the pressing ply 60 is released from the now laminated bilayer assembly 20. The laminated bilayer assembly 20 of said preferred embodiment of this invention is a bilayer or antilacerative windshield. The insert 56 is then easily removed from the hole 46 to thereby open the hole 46 to expose a portion 58 of the inner glass substrate 32.

The hole 46 is preferably adapted to receive a means (not shown) for mounting an appurtenance, accessory, or other attachment to the rigid substrate 22. In said preferred embodiment of the invention, the hole 46 is preferably sized and shaped to accept an adhesive mounting pad 50 or "button" of a rear view mirror 52, to thereby facilitate securement of the mirror 52 to the surface portion 58 of the inner glass substrate 32 exposed by the hole 46, as is shown in FIG. 5. However, neither the size or shape of the hole 46 nor the type of accessory or appurtenance secured via the hole 46 to the rigid substrate 22, is limiting to the invention.

Although not limiting to the invention, the various plies making up the laminar assembly 66 may be clamped or taped together, or otherwise held unitarily together to minimize or prevent shifting or relative slippage of the various plies during the degassing and laminating steps. Further, the thickness of the insert 56 should be exactly or nearly exactly the same thickness as the innerliner 24, to thereby present a flush surface with the innerliner 24, to thereby ensure flush conformance of the mating surfaces of the pressing ply 60 and the innerliner 24 during the degassing and laminating cycles. Flush conformance of these mating surfaces minimizes uneven stress distribution in the bilayer assembly 20 and/or the pressing ply 60, especially during the laminating operation, which if not minimized, could result in breakage of the bilayer assembly 20 and/or the pressing ply 60. It is believed that uneven stress distribution is a greater risk when the insert 56 has a greater thickness than that of the innerliner 24. However, if the insert 56 has a lesser thickness than that of the innerliner 24, then the innerliner 24 may flow between the pressing ply 60 and the insert 56 during the laminating operation. If, for example, the primary layer 42 of PVB would flow therebetween, undesirable binding or sticking may occur between the pressing ply 60 and the flowed material, thereby rendering difficult the release of the pressing ply 60, with the possible result of breakage of the pressing ply 60 and/or the bilayer assembly 20. Further, even if safe release of the pressing ply 60 were possible, the insert 56 would have to be cut out in order to be removed, with the possibility of damage being caused to the inner glass substrate 32 or the innerliner 24, in addition to the diseconomies entailed thereby.

It should be clearly understood that many variations and/or modifications of the basic inventive concepts herein taught which may appear to those skilled in the art may still fall within the spirit and scope of the present invention, which should be interpreted solely on the basis of the following claims.

What is claimed is:

1. A method for manufacturing a laminated window, comprising the steps of:
   producing a hole in an innerliner;
   assembling a rigid substrate and the innerliner together in interfacial relation to each other;
   placing an insert into the hole;

laminating the rigid substrate and the innerliner having the insert in the hole together to provide the laminated window, the insert preventing flow of the innerliner into the hole during said laminating step; and removing the insert from the hole, subsequent to said laminating step, to open the hole to expose the adjacent surface of the rigid substrate.

2. The method as set forth in claim 1, wherein said producing step is practiced after said assembling step.

3. The method as set forth in claim 2, further including the step of securing means for mounting an accessory item or the like to the exposed adjacent surface of the rigid substrate.

4. The method as set forth in claim 3, wherein said hole producing step is accomplished with an automatic hole producing means.

5. The method as set forth in claim 4, further including the step of, prior to said laminating step, cutting said innerliner to a predetermined size and shape.

6. The method as set forth in claim 5, wherein said cutting step is performed coincident with said hole producing step.

7. The method as set forth in claim 5, wherein said cutting step is accomplished with an automatic cutting means.

8. The method as set forth in claim 7, wherein the automatic cutting means includes a press having a die cutter attached thereto configured to size and shape of the innerliner.

9. The method as set forth in claim 8, wherein said press further comprises said automatic hole producing means.

10. The method as set forth in claim 4, wherein said automatic hole producing means is adapted to automatically produce said hole at a predetermined location in the innerliner.

11. The method as set forth in claim 3, wherein a pressing ply having a surface contour conforming to the surface contour of the rigid substrate is brought into pressurized engagement with the innerliner during said laminating step, and wherein further, said insert is constructed of a material which is at least substantially nonadherent to said innerliner, said pressing ply and the adjacent surface of the rigid substrate, even during said laminating step.

12. The method as set forth in claim 11, wherein said insert material comprises polypropylene.

13. The method as set forth in claim 11, further including comprises the step of, subsequent to said laminating step, releasing said pressing ply from said laminated window.

14. The method as set forth in claim 1, wherein the rigid substrate comprises a glass substrate.

15. The method as set forth in claim 14, wherein said innerliner is comprised of:

an adhesive layer interfacially engaged with the rigid substrate.

a protective plastic layer interfacially engaged with said adhesive layer; and, an abrasion-resistant layer interfacially engaged with said plastic layer.

16. The method as set forth in claim 14, wherein the innerliner is constructed of polyvinyl butyral or polyurethane.

17. The method as set forth in claim 1, wherein the rigid substrate comprises a laminated safety window structure/assembly.

18. The method as set forth in claim 3, wherein the laminated window structure/assembly comprises a bi-layer or antilacerative windshield.

19. The method as set forth in claim 18, wherein the accessory item comprises a mirror mounting button and further including the step of mounting a rear view mirror to the button.

20. The method as set forth in claim 4, wherein said automatic hole producing means comprises a press having a hole cutter attached thereto.

* * * * *

UNITED STATES PATENT AND TRADEMARK OFFICE
CERTIFICATE OF CORRECTION

PATENT NO. : 4,704,174

DATED : November 3, 1987

INVENTOR(S) : James L. Valimont and Alan L. Dumbris

It is certified that error appears in the above-identified patent and that said Letters Patent is hereby corrected as shown below:

Claim 13 (column 12, line 10), delete "comprises".

Signed and Sealed this

Seventeenth Day of May, 1988

Attest:

DONALD J. QUIGG

Attesting Officer

Commissioner of Patents and Trademarks